US012645580B2

(12) United States Patent
Lee

(10) Patent No.: US 12,645,580 B2
(45) Date of Patent: Jun. 2, 2026

(54) METHOD AND SYSTEM FOR MANAGING A MEMORY IN A VEHICLE

(71) Applicants: HYUNDAI MOTOR COMPANY, Seoul (KR); KIA CORPORATION, Seoul (KR)

(72) Inventor: Injun Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 244 days.

(21) Appl. No.: 18/218,832

(22) Filed: Jul. 6, 2023

(65) Prior Publication Data

US 2024/0077332 A1 Mar. 7, 2024

(30) Foreign Application Priority Data

Sep. 1, 2022 (KR) ........................ 10-2022-0110622

(51) Int. Cl.
*G06F 12/02* (2006.01)

(52) U.S. Cl.
CPC ................................ *G06F 12/0238* (2013.01)

(58) Field of Classification Search
CPC ............ G01C 21/3815; G01C 21/3893; G01C 21/3889; G06F 16/29; G06F 3/0629

USPC .......................................................... 707/755
See application file for complete search history.

(56) References Cited

U.S. PATENT DOCUMENTS

| | | | | |
|---|---|---|---|---|
| 11,007,979 B1 * | 5/2021 | Mitchell | ................. | B60R 25/33 |
| 2013/0297202 A1 * | 11/2013 | Tamiya | .............. | G01C 21/3679 |
| | | | | 701/430 |
| 2014/0129530 A1 * | 5/2014 | Raufman | .............. | G06F 16/901 |
| | | | | 707/693 |
| 2017/0337813 A1 * | 11/2017 | Taylor | .................. | G05D 1/0285 |
| 2021/0211496 A1 * | 7/2021 | Crowder | ............. | H04L 67/1097 |
| 2023/0003548 A1 * | 1/2023 | Schwartz | ........... | G01C 21/3881 |

* cited by examiner

*Primary Examiner* — Kuen S Lu

(74) *Attorney, Agent, or Firm* — Lempia Summerfield Katz LLC

(57) ABSTRACT

A method for managing a memory in a vehicle includes receiving information of at least one map object from a map transmission module of the vehicle. The method includes searching whether there are first memory spaces that are consecutively empty as many as the number of pieces of the received information on the static memory of the vehicle. The method includes, when there are first memory spaces, which are consecutively empty by the number of pieces of information, storing the received information of the at least one map object in the first memory spaces.

18 Claims, 5 Drawing Sheets

(a)

(b)

(a)

(b)

METHOD AND SYSTEM FOR MANAGING A MEMORY IN A VEHICLE

CROSS-REFERENCE TO RELATED APPLICATION

The present application claims priority to Korean Patent Application No. 10-2022-0110622, filed on Sep. 1, 2022, the entire content of which is incorporated herein by reference in its entirety.

FIELD OF THE PRESENT DISCLOSURE

The present disclosure relates to a method and a system for managing a memory in a vehicle.

BACKGROUND

The statements in this section merely provide background information related to the present disclosure and may not constitute prior art.

A High Definition (HD) map used for the driving of a vehicle may include map objects, such as a road link, a lane link, a lane side, a road side (e.g., a building, a fence, a guardrail, etc.), a road mark, traffic light, a traffic sign, and the like.

A system of a vehicle may acquire geometric information around the vehicle through HD map data.

Allocated to an initially-fixed number of arrays, information of each map object is stored and managed in a memory.

The quantity (i.e. the number of pieces of the information) of information for each map object may be variable. The variable information has been managed by allocating a predetermined number of arrays to each map object.

When a predetermined number of arrays are allocated to a map object, the following problems may occur.

When the number of pieces of information to be stored varies greatly from a map object to another, an object that stores only a small amount of information may have a surplus memory space that is not used in the structure. For example, when one hundred arrays as the predetermined number are allocated to each road link, 95% of the memory spaces allocated to a road link including information of only 5 points (say one array is required for each point information) is wasted.

Second, in a situation in which more information than a predetermined number of pieces needs to be stored, the full information cannot be stored.

The information included in this Background of the present disclosure section is only to enhance understanding of the general background of the present disclosure. The information may not be taken as an acknowledgement or any form of suggestion that this information forms the prior art already known to a person having ordinary skill in the art.

SUMMARY

Various aspects of the present disclosure are directed to a method and a system for managing a memory in a vehicle capable of efficiently managing memory are provided.

A method for managing a memory in a vehicle according to an embodiment of the present disclosure includes receiving information of at least one map object from a map transmission module of the vehicle. Then, the method also includes searching whether there are first memory spaces which are continuously arranged and available for storing the information in as many numbers as a number of pieces of the information on the static memory of the vehicle. The method also includes, when there are the first memory spaces, storing the information in the first memory spaces.

In addition, when there are not the first memory spaces, an importance level of each map object, information of which is a target of information stored in the static memory, is determined based on information related to the vehicle. Second memory spaces, in which information on at least one map object having a lower importance level is stored, from among the memory spaces of the static memory are initialized on the basis of the determined importance levels. After the initialization of the second memory spaces, the information of at least one map object received from the map transmission module is stored in the second memory spaces.

The information related to the vehicle includes at least one of a position of the vehicle, a speed of the vehicle, or map object use information of the vehicle.

A process of determining the importance levels is as follows. Based on the location of the vehicle, map objects located behind a driving lane of the vehicle or in a lane other than the driving lane are determined among map objects information of which are stored in the static memory. The importance levels of the determined map objects are determined on the basis of the distances between the determined map objects and the vehicle and the speed of the vehicle. The importance levels of the determined map objects are determined to be higher as the distances to the vehicle are shorter. The higher the speed of the vehicle, the lower the importance level is determined to be.

The map object use information of the vehicle includes a use frequency for driving control of the vehicle on map objects corresponding to the information stored in the static memory. Map objects are determined to have higher importance levels as the use frequencies are higher.

When the information is stored in the first memory spaces, the information is stored based on the number of the information and a start index which is earliest in the index order among indexes of the first memory spaces.

The at least one map object or each map object corresponding to the information stored in the static memory may include at least one of a road link, a lane link, a lane side, a road side, a road mark, a traffic light, or a traffic sign.

The information of the at least one map object includes information of one or more geometry points of the at least one map object.

The static memory includes a plurality of memory spaces which are pre-allocated. The pieces of information of a map object, which are received from the map transmission module, are sequentially stored in a designated index order in the plurality of memory spaces.

In at least one embodiment of the present disclosure, third memory spaces in which information of a map object behind the vehicle at a predetermined distance or greater from the vehicle is stored among the first memory spaces of the static memory are initialized based on a current location of the vehicle.

According to an embodiment of the present disclosure, a system for managing memory in a vehicle comprises: an interface configured to receive information of at least one map object from a map transmission module of the vehicle; a static memory including a plurality of memory spaces pre-allocated; and a processor. The processor searches the static memory for first memory spaces, which are continuously arranged and available for storing the information in as many numbers as a number of pieces of the information among the plurality of memory spaces. When there are the first memory spaces, the processor controls the information to be stored in the first memory spaces.

When there are not the first memory spaces, the processor determines an importance level of each map object of which the information is stored in the static memory, based on information related to the vehicle. In addition, the processor may initialize second memory spaces in which information of at least one map object having a low importance level is stored, among the memory spaces of the static memory, based on the determined importance level. In addition, the processor may store the information of the at least one map object received from the map transmission module in the second memory spaces based on the initialization of the second memory spaces.

The information related to the vehicle includes at least one of a position of the vehicle, a speed of the vehicle, and map object use information of the vehicle.

The processor determines map objects located behind the vehicle on the driving lane or in a lane other than the driving lane among map objects corresponding to information stored in the static memory, based on the location of the vehicle. The processor determines importance levels of the determined map objects, based on distances between the determined map objects and the vehicle and a speed of the vehicle. At this time, the importance levels of the determined map objects are determined to be higher as the distance from the vehicle decreases, and the importance levels are determined to be lower as the speed of the vehicle increases.

The map object use information of the vehicle includes a use frequency for driving control on the vehicle of map objects corresponding to the information stored in the static memory. Map objects corresponding to the information stored in the static memory are determined to have higher importance levels as the use frequencies thereof are higher.

The processor may store the information in the first memory spaces based on the number of pieces of information and a start index which is the earliest among indexes of the first memory spaces.

The at least one map object and the map objects corresponding to the information stored in the static memory may include at least one of a road link, a lane link, a lane side, a road side, a road mark, a traffic light, or a traffic sign.

The information about the at least one map object may include information about one or more geometry points of the at least one map object.

The pieces of information of the map object received from the map transmission module are sequentially stored in the plurality of memory spaces in a designated index order by the processor.

The processor initializes third memory spaces in which information of a map object behind the vehicle at a predetermined distance or greater from the vehicle is stored, among memory spaces of the static memory, based on a current location of the vehicle.

A method and a system for managing a memory in a vehicle according to an embodiment of the present disclosure may reduce the required memory space as compared with the prior art.

In addition, the method and system for managing memory in a vehicle according to an embodiment of the present disclosure may reduce waste of resources required for optimizing a memory space. For example, when the map database is updated, there is a possibility that the number of pieces of information representing each map object may be changed. When there is more information than a pre-allocated memory array, information omission may occur during storage of information in the related art. On the other hand, in an embodiment of the present disclosure, when a space remaining in the memory spaces is sufficient or insufficient, some memory spaces in which low importance level information is stored are initialized. Therefore, optimization of the memory space is unnecessary.

In addition, according to the method and the system for managing a memory in a vehicle according to the embodiment of the present disclosure, dynamic allocation of the memory is applied to a limited situation.

For example, in the case of dynamic allocation of memory, when accessing an unused memory address, a phrase that an error may occur in static verification is output. According to an embodiment of the present disclosure, since the memory is set in the compiling step, static verification is possible while the memory is managed together with dynamic allocation.

Also, in the case of an embedded system, the use of dynamic memory allocation is avoided due to a safety problem. The system for managing memory according to an embodiment of the present disclosure may be applied to an embedded system.

The methods and apparatuses (systems) of the present disclosure have other features and advantages, which should become more apparent from or are set forth in more detail in the accompanying drawings, which are incorporated herein, and the following Detailed Description. The accompanying drawings and the Detailed Description together serve to explain certain principles of the present disclosure.

Figure 1:
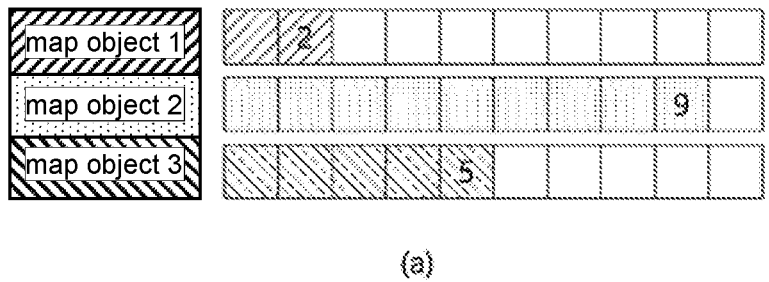
FIG. 1 (diagrams (a) and (b)) are diagrams for explaining an embodiment of the prior art and the present disclosure.
Figure 1:
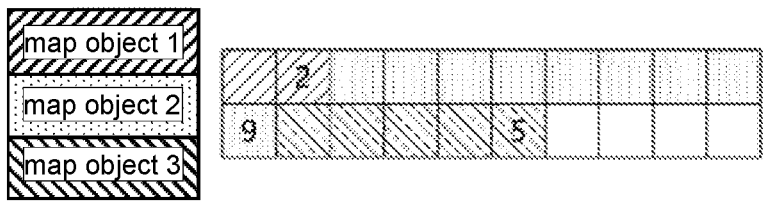

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes, will be determined in part by the particularly intended application and use environment.

In the figures, the same reference numbers refer to the same or equivalent parts of the present disclosure throughout the several figures of the drawings.

DETAILED DESCRIPTION

The same reference numerals refer to the same elements throughout the specification. This specification does not describe all elements of the embodiments. In the technical field to which the present disclosure pertains, general content or overlapping content between embodiments has been omitted. The terms "unit," "module," or "device" used in the specification may be implemented by software or hardware. According to embodiments, a plurality of "units," "modules," or "devices" may be implemented as one component, or one unit, module, or device may include a plurality of components. When a part is "connected" to another part, this includes a case where the part is directly connected as well as a case where the part is indirectly connected. The indirect connection includes a case where the part is connected through a wireless communication network. When a unit, module, device, or the like of the present disclosure is described as having a purpose or performing an operation, function, or the like, the unit, module, device, or the like should be considered herein as being "configured to" meet that purpose or to perform that operation or function. Each of the unit, module, device, and the like may separately embody or be included with a processor and a memory, such as a non-transitory computer readable media, as part of the apparatus.

In addition, when a part "includes" a component, this means that other components may be further included, rather than excluding other components, unless specifically stated otherwise.

The terms first, second, etc. are used to distinguish one component from another component. The components are not limited by the above-described terms.

A singular expression includes a plural expression unless there is a clear exception in the context.

In each step, an identification symbol may be used for convenience of description, and the identification symbol does not describe the order of each step, and each step may be performed differently from the stated order unless a specific order is clearly described in the context.

Hereinafter, the operation principle and embodiments of the present disclosure are described with reference to the accompanying drawings.

FIG. 1 is a diagram for explaining an embodiment of the prior art and the present disclosure.

Diagram (a) of FIG. 1 is a diagram illustrating an example in which variable information is stored by allocating n arrays (n: an integer) to the inside of a structure expressing each map object of a conventional precise digital map.

Referring to diagram (a) of FIG. 1, 10 arrangements are previously allocated to the inside of the structure for each map object, i.e., for each map object 1, object 2, and object 3. Also, two (2) pieces of variable information are stored in the structure of the object 1, nine (9) pieces of variable information are stored in the structure of the object 2, and five (5) pieces of variable information are stored in the structure of the object 3.

Diagram (b) of FIG. 1 is a diagram illustrating an example in which a memory space array (otherwise referred to as an information set) to store variable information of each map object is allocated by a global variable according to an embodiment of the present disclosure.

Referring to diagram (b) of FIG. 1, according to an embodiment of the present disclosure, variable information may be managed (e.g., stored, used, and/or deleted) based on the number of pieces of information and an index in which the information is to be stored. Referring to diagram (b) of FIG. 1, information of object 1, information of object 2, and information of object 3 may be sequentially stored from the front of the arrangement of the memory. As described above, an embodiment of the present disclosure sequentially stores information from the front of the arrangement and manages the information so that there is no space wasted in the middle. In other words, an embodiment of the present disclosure may efficiently manage a memory by using a small memory space compared to the prior art.

Further, in the related art, in order to store m pieces of information (n<m; n and m are integers), it is necessary to stop the execution of the software of the vehicle and increase the size of the arrangement.

However, in an embodiment of the present disclosure, when there are m spaces successively empty in the memory space arrangement, i.e., the information set, the information may be immediately stored without the termination of the software.

Hereinafter, the operation principle and embodiments of the present disclosure are described with reference to the accompanying drawings.

Figure 2:
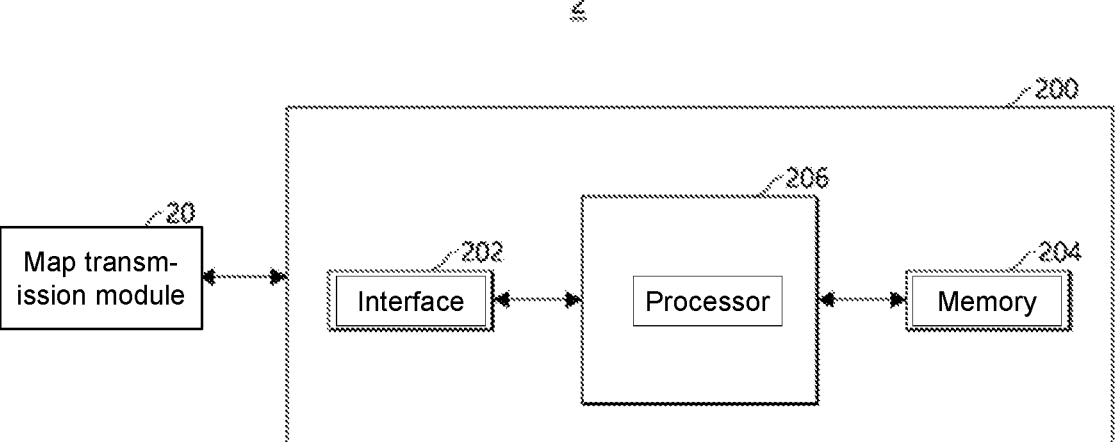
FIG. 2 is a diagram illustrating a system for managing memory of a vehicle according to an embodiment.

FIG. 2 is a diagram illustrating a system for managing memory 200 of the vehicle 2 according to an embodiment.

The system for managing memory 200 may include an interface 202, a memory 204, and/or a processor 206.

The interface 202 may transmit commands or data input from another device of the vehicle 2, for example, the map transmission module 20 or a user, to another component of the system for managing memory 200. Alternatively, the interface 202 outputs commands or data received from other components of the system for managing memory 200 to other devices of the vehicle 2.

The interface 202 may include a communication module (not shown) to communicate with another device of the vehicle 2, for example, the map transmission module 20.

For example, the communication module may include a communication module capable of performing communication between devices of the vehicle 2, for example, controller area network (CAN) communication and/or local interconnect network (LIN) communication, through a vehicle communication network. Further, the communication module may include a wired communication module (e.g., a power line communication module) and/or a wireless communication module (e.g., a cellular communication module, a Wi-Fi communication module, a short-range wireless communication module, and/or a global navigation satellite system (GNSS) communication module).

The plurality of memory spaces pre-allocated may be regions in which a variable number of information may be stored.

For example, the memory 204 may include a static memory.

For example, a plurality of memory spaces pre-allocated according to the present disclosure may be referred to as information set. In addition, the plurality of memory spaces pre-allocated according to the present disclosure may be in the form of a memory space arrangement as shown in diagram (b) of FIG. 1.

The processor 206 may manage the memory 204, for example, store and/or delete information in the memory 204 and may use information stored in the memory 204.

The processor 206 may receive information of a map object from the map transmission module 20 through the interface 202 and may store the information of the map object in the memory 204.

For example, the map object may include a map object of a High Definition (HD) map.

The map object may include at least one of a road link, a lane link, a lane side, a road side, a road mark, a traffic light, or a traffic sign road link.

The information about the map object may include information about a geometry point of the map object, and the geometry point may be one or a plurality of geometry points.

As a variable for managing the memory 204, the processor 206 may use the number of pieces of information of each map object to be stored in the memory 204 and a start index of memory spaces in which information of each map object is to be stored.

For example, when the number of pieces of information of the map object is n (n is an integer), the processor 206 may search for empty memory spaces capable of storing consecutively in addresses n pieces of information from among a plurality of memory spaces allocated in advance.

When the search for empty memory spaces capable of storing consecutively in addresses n pieces of information is successful, the processor 206 may determine an index having the earliest order among indexes of the searched memory spaces as a start index i.

The processor 206 may store n pieces of information one by one in each memory space from the memory space i in the index order in the searched memory spaces.

For example, when information of a map object is initially stored in the memory 204, the processor 206 may store n pieces of information one by one in each memory space in an order from a memory space of a first index according to an index order of memory spaces of the memory 204.

For example, when information is stored up to the memory space of index 10, the processor 204 may sequentially store n pieces of information in each memory space from the memory space of index 11 of the memory 204 one by one.

When the processor 206 uses (e.g., reads) the n pieces of information of any one map object stored in the memory 204, the information stored in each memory space may be used in an order from the memory space i of the corresponding map object in the index order.

When initializing memory spaces in which n pieces of information corresponding to a map object are stored, the processor 206 may initialize memory spaces in which n pieces of information are stored, starting from the memory space i of the corresponding map object. In other words, information stored in the memory spaces may be deleted.

For example, the initialization of memory spaces may be performed to store information of another map object newly received via the interface 202. When there are no memory spaces capable of storing all information of another newly received map object (and/or when there are insufficient memory spaces), the processor 206 may perform an initialization operation of the memory spaces. After initializing the memory spaces, the processor 206 may store information of another map objects in the memory spaces in the above-described manner.

Meanwhile, although not illustrated, the processor 206 may include a memory for storing various data used by at least one component of the system for managing memory 200. For example, a memory for storing input data and/or output data for a software program and a command related thereto may be included.

Figure 3:
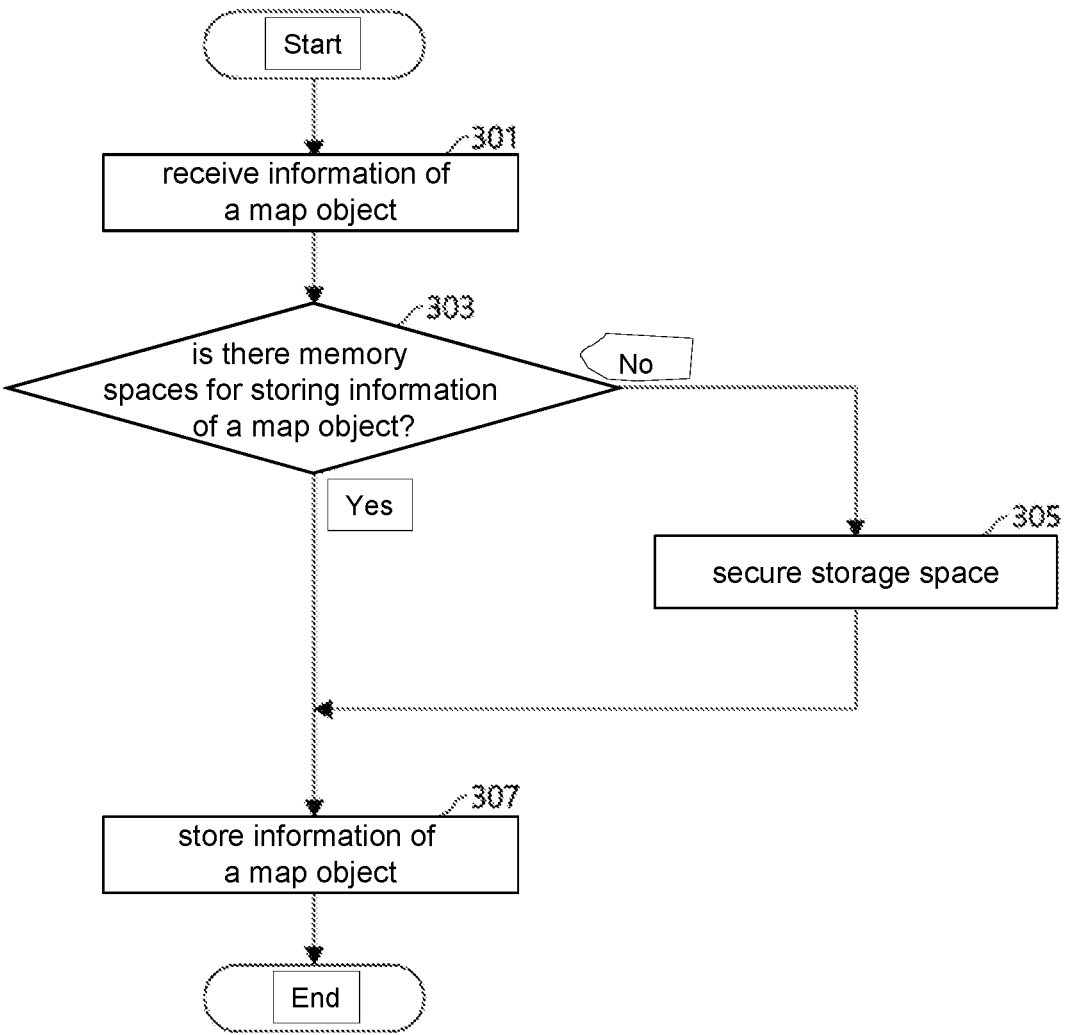
FIG. 3 is a flowchart of an operation of a system for managing memory in a vehicle according to an embodiment.

FIG. 3 is a flowchart illustrating an operation of the memory 200 and/or the processor 206 in the vehicle 2 according to an embodiment.

Referring to FIG. 3, the system for managing memory 200 searches whether there is a space for storing information of a map object in the entire memory space allocated to the memory 204. If a memory space for storing the information of the map object is insufficient, a memory space is secured by deleting information of a map object having a relatively low importance level. Then, information on the corresponding map object is stored in the secured space.

First, the system for managing memory 200 receives the information of the map object from the map transmission module 20 of the vehicle 2 (301).

The system for managing memory 200 determines whether there are memory spaces in the memory 204 in which to store the received information of the map object.

The system for managing memory 200 searches whether there are consecutively addressed empty memory spaces corresponding to the number of pieces of information of the map object on the memory 204 (303).

The system for managing memory 200 may perform operation 307 when there are memory spaces for storing the information of the map object (Yes in 303). Also, the system for managing memory 200 may perform operation 305 when there are no memory spaces for storing the information of the map object (No in 303).

The system for managing memory 200 may generate a storage space for storing the information of the map object (305).

When there are no memory spaces consecutively addressed empty as many as the number of pieces of information of the map object on the memory 204, the system for managing memory 200 determines the importance level (also referred to as a priority) of map objects corresponding to the information stored in the memory 204, based on the information related to the vehicle 2.

The information related to the vehicle 2 may include a position of the vehicle 2, a speed of the vehicle 2, and/or map object use information of the vehicle 2.

For example, the system for managing memory 200 may receive position information of the vehicle 2 and/or speed information of the vehicle 2 to determine the position of the vehicle 2 and/or the speed of the vehicle 2.

For example, the system for managing memory 200 identifies map objects (hereinafter, referred to as first map objects) located behind a driving lane of the vehicle 2 and/or on a lane other than the driving lane of the vehicle 2, among map objects corresponding to the information stored in the memory 204, based on the location of the vehicle 2.

In addition, the system for managing memory 200 determines the importance level of the first map objects based on the distance between the first map objects and the vehicle 2 and/or the speed of the vehicle 2.

For example, the system for managing memory 200 may increase the importance level of each of the first map objects as the distance from the vehicle 2 decreases. Also, the system for managing memory 200 may decrease the importance level of the corresponding map object as the speed of the vehicle 2 increases.

For example, the system for managing memory 200 may increase the importance level as the distance between each of the first map objects and the vehicle 2 decreases. As the speed of the vehicle 2 increases, the importance level of each map object determined according to the distance to the vehicle 2 may be decreased.

In this way, in the present embodiment, the importance level is set based on the position and speed of the vehicle 2. When the vehicle 2 travels at a high speed as compared with when the vehicle 2 travels at a low speed, even though information of map objects located behind the traveling lane of the vehicle 2 and/or in a lane other than the traveling lane of the vehicle 2 is deleted, the traveling of the vehicle 2 is not greatly affected. Accordingly, the above process is performed to secure the storage space of the memory 204.

The map object use information of the vehicle 2 may include a usage frequency for driving control (and/or autonomous driving control) of the vehicle 2 of the map objects corresponding to the information stored in the memory 204. The importance level of the map objects is determined to be higher as the frequency of use is higher.

For example, the importance level may include an order of importance level or an importance level score. The system for managing memory 200 may determine, as deletion object(s), one or more map objects that are in an order of a lowest importance level or have an importance level less than or equal to a predetermined threshold among the map objects corresponding to the information stored in the memory 204, based on the importance level of each of the determined map objects.

The system for managing memory 200 initializes spaces of the memory 204 in which information of the determined deletion object is stored.

The system for managing memory 200 may thus store information of a map object (307).

When spaces of the memory 204 are initialized according to operation 305, the system for managing memory 200 may store information of a received map object in the initialized memory spaces.

For example, the system for managing memory 200 may determine a start index i of the initialized spaces and may store n pieces of information of the received map object in each memory space one by one from a memory space i in an index order.

According to operation 303, when it is determined that there are spaces for storing the information of the map object, the system for managing memory 200 identifies a start index i of the corresponding spaces. Then, n pieces of information of the received map object are stored in the respective memory spaces in an order from the memory space i in the index order.

In addition, the system for managing memory 200 may initialize memory spaces of the memory 204, in which information of a map object located behind the vehicle 2 at a distance equal to or greater than a predetermined distance is stored, based on a current location of the vehicle 2. In other words, when the vehicle 2 moves away from a point where a map object corresponding to information stored in the memory 204 is located according to the driving of the vehicle 2, the corresponding map object is determined as information unnecessary for driving control of the vehicle 2. Therefore, by deleting the corresponding information from the memory 204, a space may be secured in the memory 204.

In the above embodiments, the information on each map object may be information necessary for driving control of the vehicle 2.

For example, in order for the vehicle 2 to estimate a position of the vehicle 2 (also referred to as a host vehicle) at a lateral position, a map object matched by comparing with sensor information such as a road side (e.g., a building, a fence, a guardrail, etc.), a lane side, and/or a road mark may be required. In addition, in order for the vehicle 2 to generate a driving route, a map object, such as a road link and/or a lane link, may be required.

Figure 4:
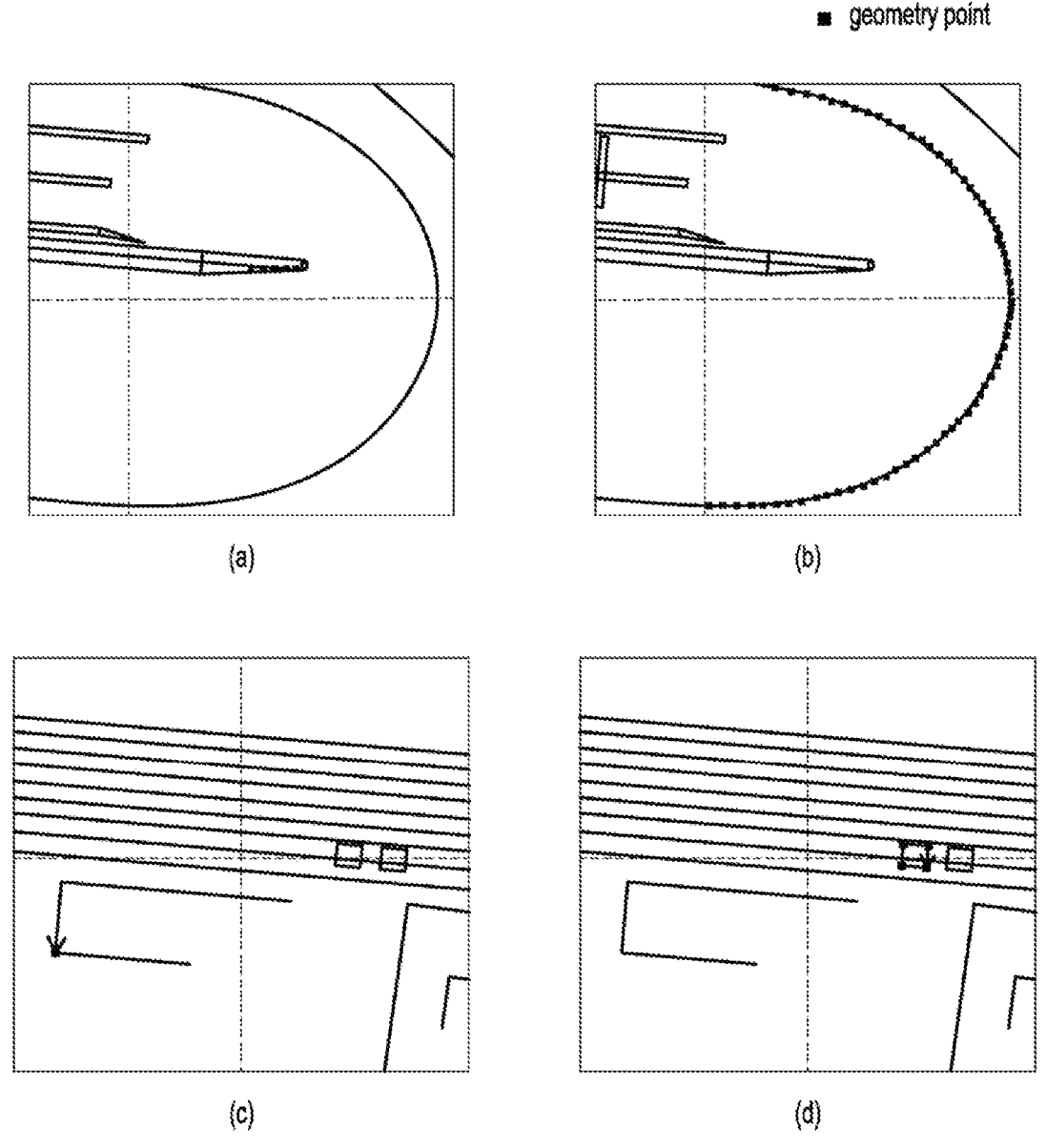
FIGS. 4 (diagrams (a)-(d)) and 5 (diagrams (a) and (b)) are diagrams illustrating examples of information of a map object transmitted from a map transmission module according to an embodiment.
Figure 5:
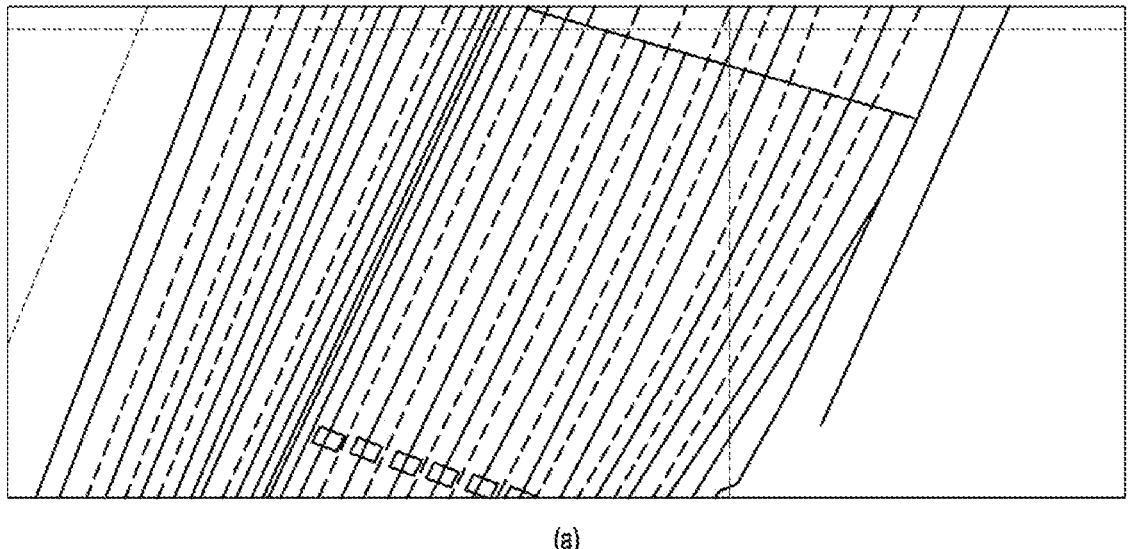
Figure 5:
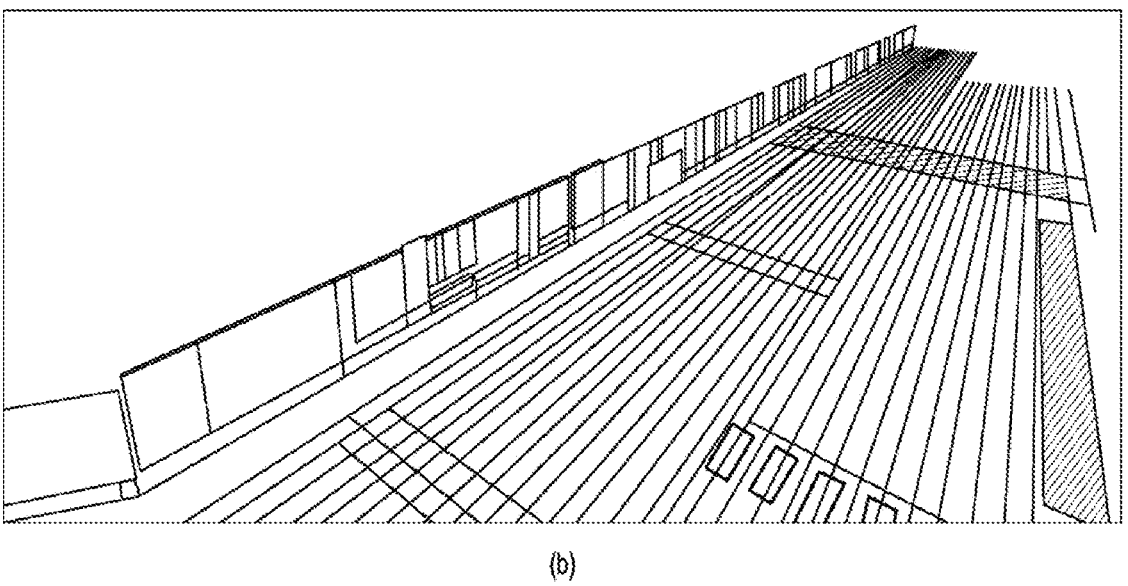

For example, in the above-described embodiments, the information on each map object is the same as that illustrated in FIGS. 4 and 5.

FIGS. 4 and 5 illustrate examples of information of a map object transmitted from the map transmission module 20 according to an embodiment of the present disclosure.

Referring to FIG. 4, the number of geometry points of a road link received from the map transmission module 20 may be five as shown in diagram (a) of FIG. 4 and may be 103 as shown in diagram (b) of FIG. 4. In addition, the number of geometry points of the objects around the road may be two as shown in diagram (c) of FIG. 4, and the number of road markings may be four as shown in diagrams (d) of FIG. 4.

Referring to diagram (a) of FIG. 5, the map transmission module 20 may not directly transmit a lane link, a lane side, and a road side to the system for managing memory 200 but may transmit the lane link, the lane side, and the road side to the system for managing memory 200 in a form of a profile called linear object definition.

For example, it is assumed that the map transmission module 20 transmits lane links as many as the number of lanes and transmits lane sides as many as the number of lane lines. In this case, when the road has 10 lanes, the map transmission module 20 may transmit about 21 pieces of information to the system for managing memory 200. In addition, the map transmission module 20 may transmit information of one road side to the system for managing memory 200.

In this way, it is considered that the number of linear object definition provided from the map transmission module 20 is variable. Therefore, the memory management technology according to the embodiment of the present disclosure may be applied to the vehicle 2 so that the memory of the vehicle 2 may be efficiently used.

Referring to diagram (b) of FIG. 5, the performance of the LiDAR applied to the vehicle 2 is improved. Accordingly, a map may be constructed by subdividing information about the height of buildings around the vehicle 2 as shown in diagram (b) FIG. 5. For example, the vehicle 2 may use the height information of the building by matching the height information with LiDAR data for precise localization. For example, the number of height information of the building may be 0 to 700, and when the height information of the building is applied to the related art, a lot of memory spaces may be wasted. On the other hand, according to an embodiment of the present disclosure, when the height information of the building is stored in the memory 204, it is possible to reduce the waste of memory space compared to the prior art. Also, in the related art, the structure of the map object around the road stored in the memory should be changed according to different height information of numerous buildings and may also be changed whenever the map database is updated. According to an embodiment of the present disclosure, information may be normally stored without the need to frequently optimize spaces of the memory 204.

In the prior art, at least 103 arrays have been allocated for the structure of each road link in a memory to represent the shape of the road link. Accordingly, in the case of the road link consisting of five geometry points as shown in diagram (b) FIG. 4, 98 memory spaces are wasted.

In embodiments of the present disclosure, the map transmission module may be materialized as a device comprising a processor and/or a memory. HD map data may be stored in the memory of the map transmission module and may be retrieved and transmitted by the process to the system for managing non-transitory computer-readable memory.

In addition, according to embodiments of the present disclosure, information of a larger number of geometry points than a pre-allocated memory arrays of a map object, such as a road link, may be stored in the memory without being missed.

In addition, according to embodiments of the present disclosure, it is possible to store information of geometry points of all map objects in the spaces of the memory without having to optimize the number of memory spaces arranged for each map object. According to embodiments of the present disclosure, since optimization of information of geometry points of all map objects is performed, time for optimizing spaces of the memory may be saved.

The above-described embodiments may be implemented in the form of a recording medium for storing instructions executable by a computer. The instructions may be stored in the form of program code. Accordingly, when executed by the processor, the operations of the embodiments may be performed by generating a program module. The recording medium may be implemented as a computer-readable recording medium.

The computer-readable recording medium includes all types of recording media in which computer-readable instructions are stored. For example, there may be a Read Only Memory (ROM), a Random Access Memory (RAM), a magnetic tape, a magnetic disk, a flash memory, an optical data storage device, etc.

As described above, the disclosed embodiments have been described with reference to the accompanying drawings. It should be understood by those of ordinary skill in the art to which the present disclosure pertains that the present disclosure may be implemented in a form different from the disclosed embodiments without changing the technical spirit or essential features of the present disclosure. The disclosed embodiments are illustrative and should not be construed as limiting.

What is claimed is:

1. A method of managing a non-transitory computer-readable memory in a vehicle, the method comprising:

receiving information of at least one map object from a map transmission module of the vehicle;

searching a static memory of the vehicle for first memory spaces that are consecutively addressed and available for storing the information in as many numbers as a number of pieces of the information;

storing the information in the first memory spaces when the first memory spaces are present;

when the first memory spaces are not present, determining an importance level for each map object, information of which is stored in the static memory, based on information related to the vehicle;

initializing second memory spaces in which information of at least one map object of a lower importance level is stored among memory spaces of the static memory; and initializing third memory spaces, in which information of a map object behind the vehicle at a predetermined distance or greater from the vehicle is stored, among the first memory spaces of the static memory, based on a current location of the vehicle.

2. The method of claim 1, further comprising:

storing the information of the at least one map object received from the map transmission module in the second memory spaces.

3. The method of claim 2, wherein the information related to the vehicle includes at least one of a position of the vehicle, a speed of the vehicle, or map object use information of the vehicle.

4. The method of claim 3, wherein the determining of the importance level comprises:

determining map objects located behind a driving lane of the vehicle or in a lane other than the driving lane, among map objects corresponding to information stored in the static memory, based on a location of the vehicle; and determining importance levels of the determined map objects based on distances between the determined map objects and the vehicle and a speed of the vehicle, wherein the importance levels of the determined map objects are determined to be higher as the distances between the determined map objects and the vehicle are shorter, and the importance levels are determined to be lower as the speed of the vehicle is faster.

5. The method of claim 3, wherein the map object use information of the vehicle includes a use frequency for driving control of the vehicle of map objects corresponding to the information stored in the static memory, and wherein the map objects corresponding to the information stored in the static memory are determined to have a higher importance level as the use frequency is higher.

6. The method of claim 2, wherein the at least one map object or each map object information of which is stored in the static memory includes at least one of a road link, a lane link, a lane side, a road side, a road mark, a traffic light, or a traffic sign.

7. The method of claim 6, wherein the information of the at least one map object includes information of one or more geometry points of the at least one map object.

8. The method of claim 1, wherein the storing of the information in the first memory spaces is performed based on the number of pieces of the information and a start index which is earliest in an index order among indexes of the first memory spaces.

9. The method of claim 1, wherein the static memory comprises a plurality of memory spaces that are pre-allocated, and wherein the method further includes sequentially storing a plurality of pieces of information of a map object received from the map transmission module in the plurality of memory spaces according to a designated index order.

10. A system for managing a non-transitory computer-readable memory in a vehicle, the system comprising:

an interface configured to receive information of at least one map object from a map transmission module of the vehicle;

a static memory including a plurality of memory spaces that are pre-allocated; and a processor configured to:

search the static memory for first memory spaces that are consecutively addressed and available for storing the information in as many numbers as a number of pieces of the information among the plurality of memory spaces and, when the first memory spaces are present, control the information to be stored in the first memory spaces;

when the first memory spaces are not present, determine an importance level of each map object of which the information is stored in the static memory based on information related to the vehicle;

initialize second memory spaces in which information of at least one map object of a lower importance level is stored among the memory spaces of the static memory; and initialize third memory spaces, in which information of a map object behind the vehicle at a predetermined distance or greater from the vehicle is stored, among the memory spaces of the static memory, based on a current location of the vehicle.

11. The system of claim 10, wherein the processor is further configured to:

store the information of the at least one map object received from the map transmission module in the second memory spaces.

12. The system of claim 11, wherein the information related to the vehicle includes at least one of a location of the vehicle, a speed of the vehicle, or map object use information of the vehicle.

13. The system of claim 12, wherein the processor is further configured to:

determine map objects located behind a driving lane of the vehicle or in a lane other than the driving lane among map objects corresponding to information stored in the static memory based on a position of the vehicle; and determine importance levels of the map objects based on distances between the map objects and the vehicle and a speed of the vehicle, wherein the importance levels of the map objects are determined to be higher as the distances between the determined map objects and the vehicle are shorter, and the importance levels are determined to be lower as the speed of the vehicle is faster.

14. The system of claim 12, wherein the map object use information of the vehicle includes a use frequency of map objects for driving control of the vehicle, and wherein the map objects corresponding to the information stored in the static memory are determined to have a higher importance level as the use frequency is higher.

15. The system of claim 11, wherein the at least one map object or each map object information of which is stored in the static memory includes at least one of a road link, a lane link, a lane side, a road side, a road mark, a traffic light, or a traffic sign.

16. The system of claim 15, wherein the information of the at least one map object includes information of one or more geometry points of the at least one map object.

17. The system of claim 10, wherein the processor is further configured to store the information in the first memory spaces based on the number of pieces of the information and a start index which is earliest in an index order among indexes of the first memory spaces.

18. The system of claim 10, wherein the processor is further configured to sequentially store the pieces of the information of the at least one map object received from the map transmission module in the plurality of memory spaces in a designated index order.

\* \* \* \* \*